United States Patent [19]

Grosse

[11] Patent Number: 4,543,604
[45] Date of Patent: Sep. 24, 1985

[54] DIAGNOSTIC RADIOLOGY SYSTEM FOR ANGIOGRAPHIC X-RAY EXAMINATIONS

[75] Inventor: Burkhard Grosse, Erlangen, Fed. Rep. of Germany

[73] Assignee: Siemens Aktiengesellschaft, Berlin & Munich, Fed. Rep. of Germany

[21] Appl. No.: 483,872

[22] Filed: Apr. 11, 1983

[30] Foreign Application Priority Data

Apr. 26, 1982 [DE] Fed. Rep. of Germany ....... 3215552

[51] Int. Cl.$^4$ .......................... H04N 7/18; A61B 6/00
[52] U.S. Cl. .................................... 358/111; 128/654; 364/414; 378/99
[58] Field of Search ................ 358/111; 128/653–655; 378/99; 364/414

[56] References Cited

U.S. PATENT DOCUMENTS 4,437,161  3/1984  Anderson ............................. 358/111
4,483,342  11/1984  Pfeifer ................................. 128/653

FOREIGN PATENT DOCUMENTS 3122098  6/1981  Fed. Rep. of Germany .
3148789  12/1981  Fed. Rep. of Germany .

Primary Examiner—Howard W. Britton
Attorney, Agent, or Firm—Hill, Van Santen, Steadman & Simpson

[57] ABSTRACT

An exemplary embodiment comprises an image intensifier television pickup installation, at least one image memory, a subtraction device for the subtraction of image data occurring at different times, and a video monitor, in which there are supplied to the subtraction device the current video signal and a video signal averaged over several images in the image memory. There is connected to the subtraction device a maximum detector which recognizes the maximum of the contrast medium flow. The maximum detector is connected to the image memory for effecting the storage of a filling image.

15 Claims, 3 Drawing Figures

DIAGNOSTIC RADIOLOGY SYSTEM FOR ANGIOGRAPHIC X-RAY EXAMINATIONS

BACKGROUND OF THE INVENTION

The invention relates to a diagnostic radiology system for angiographic X-ray examinations, comprising an image intensifier television pickup installation, at least one image memory, a subtraction device for the subtraction of image data occurring at different times, and a video monitor. Subtraction images find utilization in the case of fluoroscopic examinations, in particular in the case of selective angiography, in order to render blood vessels clearly visible which, in the normal X-ray image, can be poorly recognized or on which bone structures are superimposed.

In the German patent application No. P 31 22 098.3 (U.S. Pat. No. 4,483,342 issued Nov. 20, 1984), a diagnostic radiology system of the type initially cited is described in which a radiograph of a blank image (mask), that is an image taken without contrast medium filling, and of a filling image, that is an image taken with injected contrast medium, proceeds manually pursuant to visual control on the monitor. For storing in the image memory, a trigger must be actuated. In the German patent application No. P31 48 789.0 an image subtraction device is described in which the radiographic time-point for storage of the blank image, as well as the chronological interval of the stored blank image relative to the filling image to be stored are manually input into a program memory on an operating console. After a program start the radiographic image recording sequence proceeds automatically controlled by a control device. For the time-points of the respective radiographs, experimentally ascertained experimental values are utilized. Since, however, the time-point for the storage of an optimum mask and the time-point for the storage of an optimum filling image are substantially dependent upon the patient, in particular upon the blood flow velocity of the patient, in most instances one does not obtain any optimum subtraction images. In the case of the manual triggering of the storage operations pursuant to visual control, conditioned by the reaction time of the observer and by the low recognizability of the optimum time-points, the latter can be attained only in rare instances. In order to preclude a movement of the patient the radiographic exposure time-points must lie as closely as possible next to one another. However, this contradicts the demand for obtaining as great a contrast as possible in order to render possible the visibility also of small objects. A compromise between these two demands can be optimally found only with difficulty using the described storage methods.

SUMMARY OF THE INVENTION

The invention proceeds from the objective of producing a diagnostic radiology system of the type initially cited in which the recognition of the optimum time-points and the storage of the respective radiographic exposure proceed automatically.

In accordance with the invention the objective is achieved in that there are supplied to the subtraction device, a current on-line video signal and a video signal averaged over several images in the image memory, that there is connected to the subtraction device a maximum detector which recognizes the maximum of the contrast medium flow, and that the maximum detector is connected to the image memory for controlling the storage of a filling image. Through the automatic recognition of the maximum of the contrast medium density an optimum filling image can be stored.

An optimum blank image, which lies shortly before the rise of the contrast medium, can be stored if an additional detector is connected to the subtraction device which forms a difference between the current on line video signal and the video signal corresponding to a stored mask, if the detector is connected with an additional image memory for the storage of an optimum mask, and if adjustment means for the selection of a threshold value are arranged at the detector. A simple circuit construction results if a changeover switch is connected to the subtraction device which, until the setting of the optimum mask, supplies the difference signal to the detector, and if, following the storage of the mask, the change-over switch is switched to the maximum detector. The recognizability of the time-points is increased if the detectors exhibit as input stage one summation stage each. The circuit construction becomes furthermore simplified if the summation stage is connected between the subtraction device and the changeover switch. An optimum time-point of the change-over switching of the detectors results if the detector controls the change-over switch. The operational sequence of the diagnostic radiology system can be visually followed if there is connected to the image memories an additional subtraction stage which is connected with the monitor. A second subtraction stage can be saved if an additional change-over switch is provided whose first switching contact is connected to the television camera and whose second switching contact is connected to the image memory, and if the change-over switch is connected with the subtraction device to which the monitor is connected.

The invention shall be explained in greater detail in the following on the basis of an exemplary embodiment illustrated on the accompanying drawing sheet; and other objects, features and advantages will be apparent from this detailed disclosure and from the appended claims.

DETAILED DESCRIPTION

Figure 1:
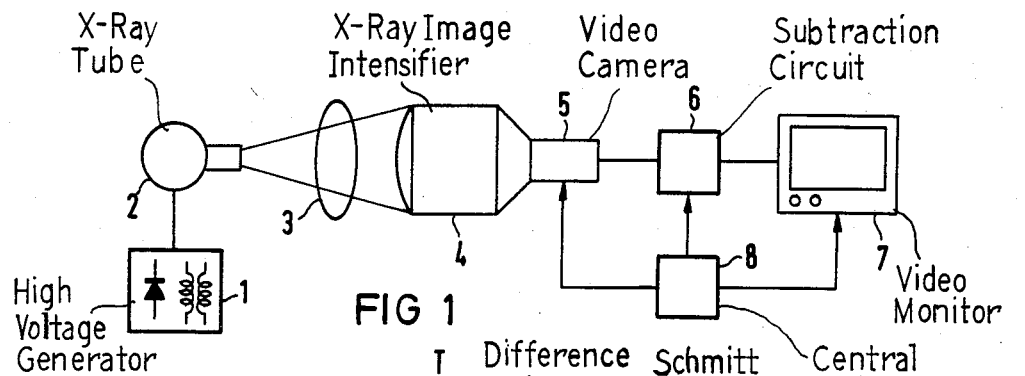
FIG. 1 illustrates a diagnostic radiology system according to the invention.

In FIG. 1 an X-ray tube 2, operated by a high voltage generator 1, is illustrated which emits a radiation beam which penetrates a patient 3 and projects a radiation image on the inlet fluorescent screen of an X-ray image intensifier 4. The output image of the X-ray image intensifier 4 is picked up by a television camera 5, further processed in a subtraction device 6, and displayed on a video monitor 7. A central unit 8 controls the synchronous operating sequence of the signal generation and signal processing of the television camera 5, the subtraction device 6, and the monitor 7.

Figure 2:
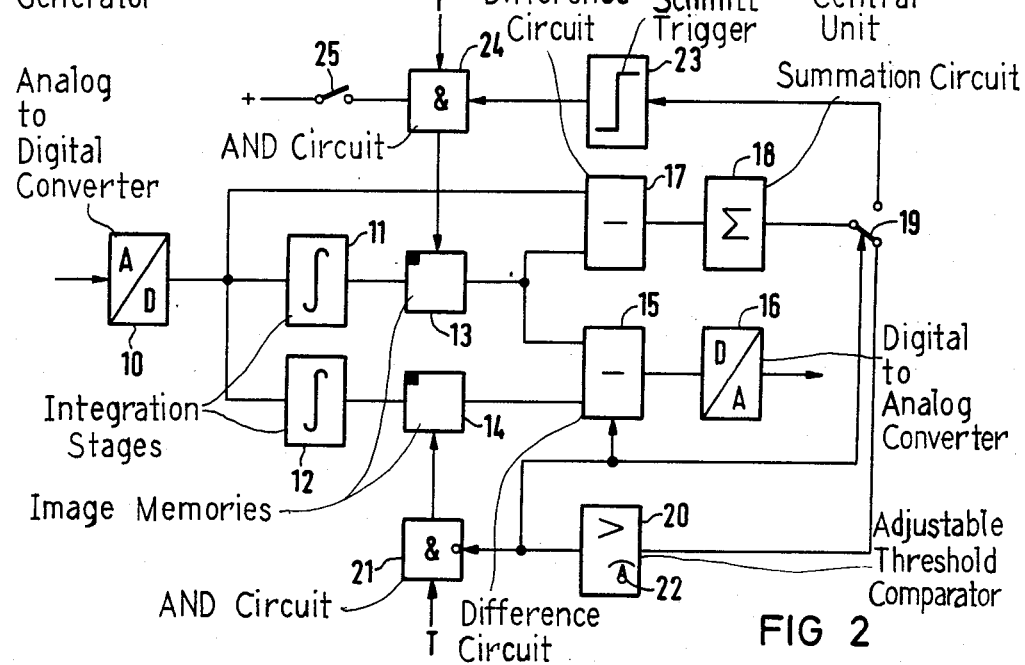
FIG. 2 illustrates a block circuit diagram of the processing circuit of FIG. 1.

In FIG. 2, a subtraction device 6 is illustrated to which the video signal of the television camera 5 is supplied which is digitized in an analog-to-digital converter (A/D converter 10). The A/D converter 10 is connected with two integration stages 11, 12, to which image memories 13, 14 are connected. The outputs of the image memories 13, 14 are connected with a difference stage 15 whose difference signal is supplied to the monitor 7 via a digital-to-analog converter (D/A converter 16). This is a construction of the initially cited, known subtraction device.

The A/D converter 10, however, is furthermore provided with a second difference stage 17 to which also the output signal of the first image memory 13 is supplied. The difference values of all image points of the output signal of the difference stage 17 are added in a summation unit 18. Via a change-over switch 19 the output signal of the summation unit 18 arrives at a comparator 20 which is connected with a negation input of an AND circuit 21 which effects a through-connection of the clock pulse T from the central unit 8 to the image memory 14 until disabled by the output from comparator 20. Connected to the comparator 20 is an adjustment means 22 with which the response threshold of the comparator 20 can be altered. The output signal of the comparator 20, however, also controls the change-over switch 19 and the difference stage 15. The other switching contact of the change-over switch 19 is connected to a Schmitt trigger 23 whose output is connected with an AND-circuit 24 to the second input of which the clock pulse T of the central unit 8 is connected. Via a switch 25 the voltage source (+) can be connected at an additional input of the AND circuit 24. The output of the AND circuit 24 is connected with the clock pulse input of the image memory 13.

At the commencement of the radiograph the switch 25 is actuated so that there is read into the image memory 13 an image or an image integrated over several radiographs. The actuation of the switch 25 can proceed manually or automatically through a control device, for example, subsequent to switching on of the X-ray tube. In the image memory 14 the video signals are integrated from the start continuously over several images. Following the storage of the mask in the first image memory 13, there are connected to the difference stage 17 a video signal, which corresponds to a first mask, and the current on-line video signal from A/D converter 10. The difference values of all image points of an image are summed up and supplied to the comparator 20. As long as the sum of all image points does not exceed a threshold value selected by means of the adjustment means 22, images are continuously integrated in the image memory 14. Simultaneously, the change-over switch 19 remains in its illustrated position. If the threshold value selected by the adjustment means 22 is exceeded, which can be explained by the rise of the contrast agent, the comparator 20 generates a TRUE logical output signal, so that the AND circuit 21 is blocked and the clock pulse for the image memory 14 is stopped. There is now contained in the image memory 14 the image point data of the video signals integrated over, for example, sixteen images, and this integrated image point data corresponds to a second, optimum mask.

This operation of locating the optimum mask can be observed on the monitor 7. In the difference stage 15, to this end, there is subtracted, from the video signal continuously integrated in the image memory 14, the video signal contained in the image memory 13, corresponding to the first mask. The slow rise of the contrast medium can thereby be followed. With the occurrence of the TRUE output signal from the comparator 20 the difference stage 15 is switched over in such a fashion that the video signal of the image memory 14, which corresponds to the second mask, is subtracted from the video signal of the image memory 13 in which now the images are continuously integrated.

Figure 3:
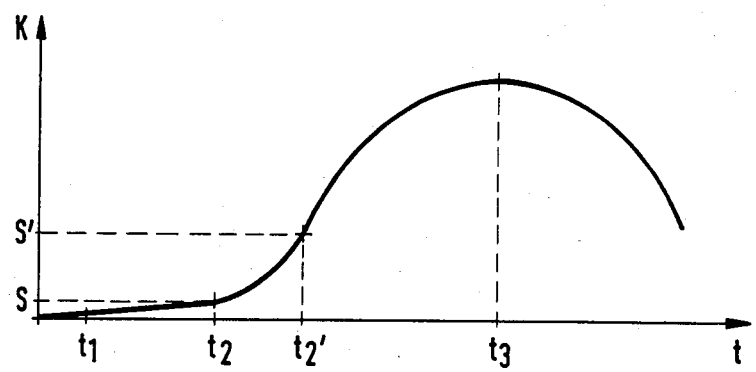
FIG. 3 illustrates a curve for the explanation of FIG. 2.

On the basis of the curve in FIG. 3 the recognition of the optimum mask shall be explained yet in further detail. In the latter, the contrast medium density K is plotted as a function of time t. At the beginning, for example, of the fluoroscopy or of the injection of the contrast medium, or manually, at a time-point $t_1$, a first mask is set in the image memory 13. Through the adjustment means 22 a threshold value S or a threshold value S' can be selected. If the contrast medium density K exceeds this threshold value S or S', then, at a time-point $t_2$ or $t_2'$, a second, optimum mask is read into the image memory 14. The higher the threshold value S, S', is selected, the less susceptible the diagnostic radiology system is to patient movements. The disadvantages here, however, is that the difference between the mask and the filling image is reduced.

Through the TRUE logical output signal of the comparator 20 the change-over switch 19 also is actuated, so that now the output signal of the summation stage 18 is supplied to the Schmitt trigger 23. Now the image memory 13 receives its memory clock pulse, so that, in the latter, the current on-line video signals are integrated over several images. Conditioned by the continuous rise of the contrast medium density, the sum signal is greater than zero. If, by contrast, the maximum is attained at the time-point $t_3$, then the current on-line video signal after a few television images becomes smaller than the integrated signals, so that the memory clock pulse from AND gate 24 is interrupted and there is contained in the image memory 13 an optimum filling image of a maximum contrast medium density. Since averaging has been carried out over several images, for example, over sixteen images, the time-point $t_3$ lies approximately in the center of the radiograph section, so that an approximately equally great number of images lies before and after this time-point.

Via the first difference stage 15 and the D/A converter 16, also this operation can be controlled (or checked) on the monitor. After the second mask was set in the image memory 14 at the time point $t_2$, the difference stage 15 was switched-over, so that now the current on line video signal is integrated in the image memory 13 over several images and the second mask is subtracted therefrom. On the monitor 7 there can now furthermore be seen the rise of the contrast medium progression to its maximum. If the optimum filling image is then read into the image memory 13, then the optimum difference image appears on the monitor 7.

If a visual observation of the rise of the contrast medium as well as of the memory operation is not to take place, then the difference stage 15 can be eliminated if an additional change-over switch is provided which, after completed storage of image memory 13 with the optimum filling image, connects, instead of the current on line video signal, the stored signal of the image memory 14 to the difference stage 17. In this case, there is connected to the output of the difference stage 17 the D/A converter 16.

Through the selection of the size of the threshold S the false storage of a mask due to the movement of the patient 3 can be prevented. Moreover, the movement of the patient 3 delivers a different signal only at edges, for example at the edge of a bone. Through the movement, however, at the one edge, a positive difference signal is generated, and at the other edge, from the point of view of amount, an approximately equally great negative difference signal is generated, so that the latter generally cancel one another during the summation. Through the selection of the threshold value S, still-remaining movement signals can be suppressed.

It will be apparent that many modifications and variations may be made without departing from the scope of the teachings and concepts of the present invention.

I claim as my invention:

1. Diagnostic radiology system for angiographic X-ray examinations, comprising an image intensifier television installation including an image intensifier and a video camera, at least one image memory connected with said video camera, a subtraction device for coupling with the video camera and with the image memory and operable for effecting subtraction of image data occurring at different times, a video monitor for coupling with said subtraction device, characterized in that there are supplied to the subtraction device a current video signal from the video camera and a video signal averaged over several images from the image memory, a maximum detector is connected with the subtraction device, said maximum detector being responsive to the maximum of the contrast medium flow, and being connected to the image memory for controlling the storage of a filling image thereby.

2. Diagnostic radiology system according to claim 1, with an additional image memory, characterized in that an additional detector is connected to the subtraction device, said subtraction device supplying to the additional detector a difference signal in accordance with the difference between the current video signal and the video signal corresponding to a stored mask, that the additional detector is connected with the additional image memory for controlling the storage of an optimum mask, and that adjustment means for the selection of a threshold value are coupled with the additional detector for controlling the degree of contrast medium filling at which the optimum mask is stored in said additional image memory.

3. Diagnostic radiology system according to claim 2, characterized in that a change-over switch is connected with the subtraction device, said change-over switch supplying the difference signal to the additional detector until the optimum mask has been loaded into said additional image memory, and that, following the storage of the optimum mask, the change-over switch is switched over to activate the maximum detector.

4. Diagnostic radiology system according to claim 2, characterized in the detectors each having at its input a summation stage.

5. Diagnostic radiology system according to claim 3, characterized in that a summation stage is connected between the subtraction device and the change-over switch.

6. Diagnostic radiology system according to claim 3, characterized in that the additional detector controls the change-over switch.

7. Diagnostic radiology system according to claim 1, with at least two image memories, characterized in that there is connected to the image memories an additional subtraction device which is connected with the monitor to supply a difference signal thereto which is a function of the difference between images stored by said image memories.

8. Diagnostic radiology system according to claim 1, with at least two image memories including an additional image memory, characterized in that an additional change-over switch is provided whose first switching contact is connected to the video camera and whose second switching contact is connected to the additional image memory, and that the change-over switch is connected with the subtraction device with which the monitor is coupled.

9. A medical imaging system comprising:
image substraction means for subtracting respective image signals supplied thereto, and having an output for supplying a resultant signal,
image signal generating means for generating image signals representing successive radiation images of a subject exhibiting a density which progressively increases, reaches a maximum, and then decreases over a given time span, said image signal generating means supplying successive individual image signals to said image subtraction means during said time span which have amplitude values which vary according to the density exhibited by the subject as a function of time,
image processing means supplying to said image subtraction means during said time span successive averaged image signals each averaged over successive individual image signals from said image signal generating means such that the averaged image signals reach a maximum amplitude value at a point in time after the individual image signal having a maximum in amplitude value, and
maximum detector means connected with the output of the image subtraction means and sensing when an individual image signal supplied to the image subtraction means has an amplitude value less than that of an averaged image signal concurrently supplied to said image subtraction means during said time span, for detecting the maximum in the density exhibited by the subject independently of the density level of such maximum.

10. A medical imaging system according to claim 9, wherein the image processing means comprises an image memory means which supplies successive averaged image signals during said time span such that the resultant signal from the image subtraction means has one polarity during the time wherein the subject exhibits progressively increasing density and has an opposite polarity after the occurrence of a few individual image signals beyond the individual image signal having a maximum in amplitude value, said maximum detector means sensing the transition in the resultant signal from the image subtraction means from the one polarity to the opposite polarity.

11. A medical imaging system according to claim 10, wherein said image memory means is controlled by said maximum detector means to retain an averaged image signal which is present therein when the maximum detector means senses the transition in the resultant signal from the one polarity to the opposite polarity.

12. A medical imaging system according to claim 11, wherein said image memory means retains an averaged image signal based on about sixteen successive radiation images of the subject which occur at the density exhibited by the subject is in the vicinity of the maximum.

13. A medical imaging system according to claim 9, wherein said maximum detector means comprises summation means connected to the output of said image substraction means, and operating to form a sum signal based on a summation of image points of each resultant signal, said sum signal having one polarity prior to the individual image signal having a maximum in amplitude value and having the opposite polarity a few individual image signals beyond such individual image signal having a maximum in amplitude value.

14. A medical imaging system according to claim 9, with said image signal generating means comprising an X-ray image intensifier and camera means for generating individual image signals during introduction of a contract medium into the subject, and supplying to the image subtraction means successive individual image signals whose amplitude values vary according to the density of the contrast medium flow.

15. A medical imaging system according to claim 14, with said image processing means comprising first memory means for supplying said successive averaged image signals to said subtraction means during said given time span, and second memory means connectable with said image intensifier and camera means for selectively storing image signals, and connectable with said image subtraction means along with said first memory means such that said image subtraction means supplies difference image signals based on an image point subtraction of image signals from the first and second memory means, and memory control means controlling the storage of an optimum mask image in said second memory means as the density of the contrast medium flow begins to increase during an initial time interval, said first memory means storing a fixed blank image during said initial time interval so that said image subtraction means supplies a resultant signal of progressively increasing amplitude value, and said memory control means controlling said first and second memory means and being responsive to a selected amplitude value of the resultant signal to effect storage of a current image signal in said second memory means as the optimum mask image signal, and for thereafter operating said second memory means to generate the successive averaged image signals during said given time span.

* * * * *